United States Patent [19]

Fleming

[11] Patent Number: 4,752,173
[45] Date of Patent: Jun. 21, 1988

[54] HAND TRUCK APPARATUS FOR LIFTING AS WELL AS TRANSPORTING LOADS, SUCH AS SOLID CORE DOORS, AND METHOD OF INSTALLING A DOOR

[76] Inventor: Jeffrey B. Fleming, 2112 Banner Ct., Martinez, Calif. 94553

[21] Appl. No.: 732,530

[22] Filed: May 8, 1985

[51] Int. Cl.[4] .............................. B60P 1/02; B66F 9/06
[52] U.S. Cl. ...................................... 414/10; 254/2 R; 269/905; 280/47.34; 403/72; 403/119; 414/490; 414/786
[58] Field of Search ................... 414/10, 11, 490, 491, 414/427, 786, 495; 280/47.2, 47.17, 47.34, 47.18; 298/2; 254/2 R; 269/904, 905; 403/72, 119; 92/13.8

[56] References Cited

U.S. PATENT DOCUMENTS

| | | | |
|---|---|---|---|
| 2,514,825 | 7/1950 | Zenko | 280/47.34 X |
| 2,681,712 | 6/1954 | West | 280/47.34 X |
| 2,797,004 | 6/1957 | Miller | 414/427 |
| 2,904,201 | 9/1959 | Rhodes | 298/2 |
| 3,035,727 | 5/1962 | Turner | 414/490 X |
| 3,510,016 | 5/1970 | Wolff et al. | 414/427 X |
| 4,050,597 | 9/1977 | Hawkins | 414/427 |
| 4,536,123 | 8/1985 | Snyder | 254/2 R X |

FOREIGN PATENT DOCUMENTS 757186  9/1956  United Kingdom ................... 298/2

Primary Examiner—Frank E. Werner
Assistant Examiner—Janice Krizek
Attorney, Agent, or Firm—William C. Milks, III

[57] ABSTRACT

A hand truck apparatus configured for transporting, as well as lifting, a load and also configured so that the hand truck apparatus is self-stabilizing under all conditions of use. The hand truck apparatus in accordance with the invention provides mechanical advantage for lifting the load and is configured for precisely lifting the load to a raised position. The hand truck apparatus in accordance with the invention is self-stabilizing when a load is not placed on the hand truck apparatus, as well as when a load is placed on the hand truck apparatus and for any raised position of the load. The hand truck apparatus in accordance with the invention is particularly advantageous when used in connection with transporting and installing solid core doors. Hinge plates are first attached to the edge of the door. The door is then placed on the hand truck apparatus and transported to the location of installation. The door can then be lifted by the hand truck apparatus to the proper position for securing the hinge plates to the door frame. Since the hand truck apparatus is self-stabilizing with the door in the raised position, the user can release the hand truck apparatus and secure the hinge plates to the door frame. As a result, a single worker can install a door whereas heretofore at least two workers were required for the task. Other features are also disclosed.

20 Claims, 2 Drawing Sheets

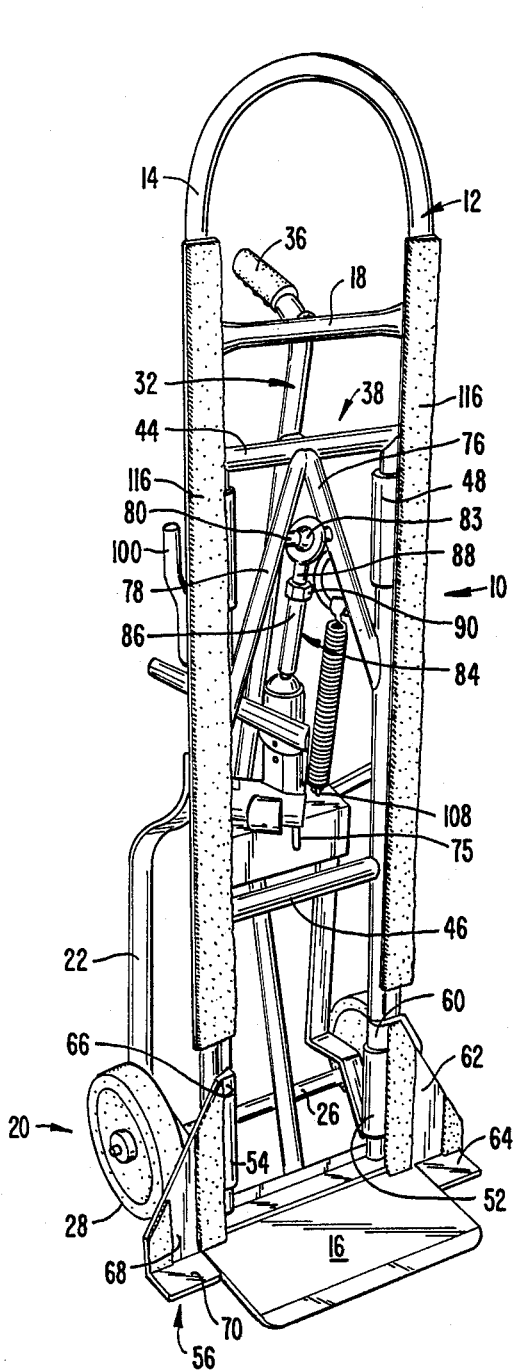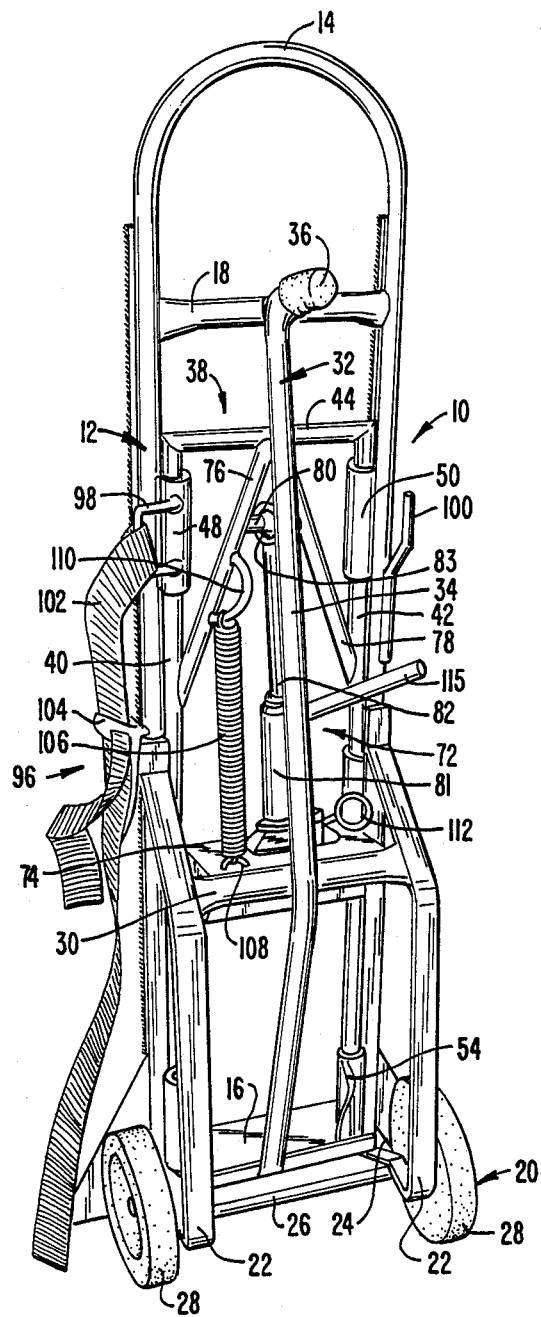
FIG._1.  FIG._2.

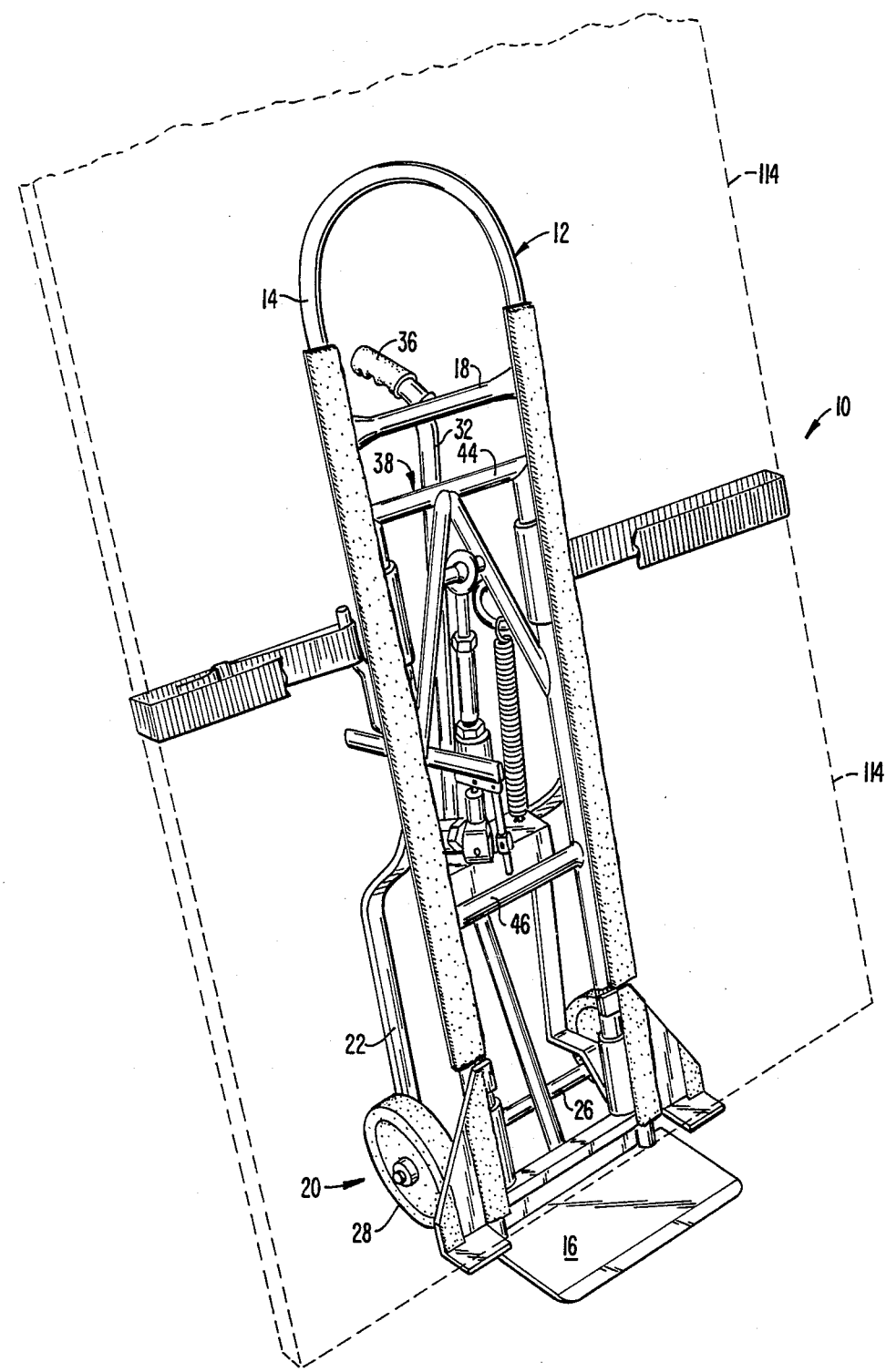
FIG._3.

HAND TRUCK APPARATUS FOR LIFTING AS WELL AS TRANSPORTING LOADS, SUCH AS SOLID CORE DOORS, AND METHOD OF INSTALLING A DOOR

BACKGROUND OF THE INVENTION

This invention relates to wheeled vehicles for conveying loads and, more particularly, to manually propelled wheeled carts for transporting loads, commonly referred to as hand trucks. Specifically, the invention is directed to a hand truck apparatus which can not only be used for transporting a load, but also can be used for lifting the load to a raised position, and which is configured such that the hand truck apparatus is self-stabilizing even if the load is in the raised position on the hand truck apparatus. The hand truck apparatus in accordance with the invention is especially advantageous during the transporting and installation of solid core doors, for example.

Various equipment is known for conveying loads. Hand trucks are one known type of equipment for transporting loads.

Typically, known hand trucks comprise an upright frame or chassis having a horizontal plate connected to the lower end of the chassis configured to be slid under a load. At least one, and typically two, wheels are connected to an axle mounted to the chassis rearwardly of the load supporting plate. The underside of the load supporting plate and the lower periphery of the wheels form a base for the hand truck such that the hand truck is self-stabilizing in the upright position whether or not a load is placed on the load supporting plate. The hand truck further includes a handle connected to the chassis.

In operation, a user places a load on the load supporting plate, stands on the side of the hand truck opposite the load supporting plate, grips the handle, and pulls the handle in order to lift the load suppporting plate from the ground such that the weight of the load is borne over the wheels. The wheels serve as a fulcrum for permitting the load to be leveraged from the ground. The hand truck can then be rolled on the wheels for transporting the load.

Some hand trucks further include runners connected to the chassis which extend away from the chassis beyond the outer periphery of the wheels. The runners allow the hand truck to be pulled by the user up an incline as a sled.

Unfortunately, the runners give the user no mechanical advantage in lifting the load. Furthermore, the hand truck is not in a self-stabilized condition while the load is being lifted.

Other equipment is known for lifting and transporting loads. Montour, U.S. Pat. No. 2,548,806, for example, discloses the use of two dollies each including load engaging elements configured to be slid under a load in a lowered position. The load engaging elements are vertically movable with respect to an upright frame. The dollies each include caster wheels mounted to the upright frame rearwardly of the load engaging elements. The dollies further each include a jack for raising the load engaging elements after the elements are inserted under a load for lifting the load. The load can then be transported.

Unfortunately, although the dollies disclosed in Montour, U.S. Pat. No. 2,548,806, are self-stabilized while the load engaging elements are in the lowered position, the dollies must be used in tandem in order to support a load in a stable condition when the load engaging elements are in a raised position. Since the dollies can only be used in pairs, the use of the dollies disclosed in Montour, U.S. Pat. No. 2,548,806, is limited; for example, the dollies cannot be used for transporting and installing solid core doors.

Solid core doors have heretofore been manually carried or else transported by known hand truck equipment in connection with the installation of the door. After the door is transported to the location of installation, at least two workers are needed for installing the door. Installation requires that hinge plates be attached to the edge of the door and that the door be manually lifted into position for also securing the hinge plates to the door frame. Precise positioning of the door with respect to the door frame is very difficult, especially in the case of two workers where one worker must secure the hinge plates to the door frame, as well as aid in lifting the door. Furthermore, the use of several workers to accomplish the task of door installation is costly.

SUMMARY OF THE INVENTION

This invention provides a hand truck apparatus configured for transporting, as well as lifting, a load and also configured so that the hand truck apparatus is self-stabilizing under all conditions of use. The hand truck apparatus in accordance with the invention provides mechanical advantage for lifting the load and is configured for precisely lifting the load to a raised position. The hand truck apparatus in accordance with the invention is self-stabilizing when a load is not placed on the hand truck apparatus, as well as when a load is placed on the hand truck apparatus and for any raised position of the load.

In accordance with the invention an improvement is provided in a hand truck apparatus including a chassis having a longitudinal axis, a load supporting plate connected to the chassis, and at least one wheel rotatably mounted to the chassis. The improvement comprises: frame means; means connected to the chassis for mounting the frame means to the chassis so that the frame means is movable with respect to the chassis along the longitudinal axis of the chassis; load engaging means connected to the frame means, the load engaging means being movable together with the frame means, between a home position, which lies approximately in a plane of the load supporting plate, and a raised position, above the load supporting plate; and jacking means connected between the chassis and the frame means actuable for moving the load engaging means from the home position to the raised position; whereby the load supporting plate, wheel, and load engaging means form a base for self-stabilizing the hand truck apparatus when the load engaging means is in the raised position.

The hand truck apparatus in accordance with the invention is particularly advantageous when used in connection with transporting and installing solid core doors. Hinge plates are first attached to the edge of the door. The door is then placed on the hand truck apparatus and transported to the location of installation. The door can then be lifted by the hand truck apparatus to the proper position for securing the hinge plates to the door frame. Since the hand truck apparatus is self-stabilizing with the door in the raised position, the user can release the hand truck apparatus and secure the hinge plates to the door frame. As a result, a single worker can install a door whereas heretofore at least two workers were required for the task.

BRIEF DESCRIPTION OF THE DRAWINGS

The above and other features of the invention and the concomitant advantages will be better understood and appreciated by those skilled in the art in view of the description of the preferred embodiments given below in conjunction with the accompanying drawings. In the drawings:

FIG. 1 is a front isometric view of one embodiment of the hand truck apparatus in accordance with the invention positioned for engaging a load;

FIG. 2 is a rear isometric view of the hand truck apparatus shown in FIG. 1; and FIG. 3 is a view of the hand truck apparatus shown in FIG. 1 with a load engaged on the hand truck apparatus and lifted to a raised position.

DESCRIPTION OF THE PREFERRED EMBODIMENTS

The invention provides a self-stabilizing hand truck apparatus for use in transporting and lifting a load to a raised position. The hand truck apparatus can be moved from one location to another and left unattended with the load supported by the hand truck apparatus in the unraised or home position or, alternatively, in a raised position. Consequently, the hand truck apparatus can be used for transporting heavy loads and unloading the load onto a raised platform, such as a hydraulically powered tailgate of a truck. Furthermore, the hand truck apparatus in accordance with the invention is especially useful in transporting solid core doors to the location of installation and lifting the door with respect to the door frame to the proper position for installing the door.

One embodiment of hand truck apparatus in accordance with the invention, generally indicated by the numeral 10, is shown in FIG. 1. The hand truck apparatus 10 preferably includes a commercially available hand truck, such as a Model No. 58-PM hand truck manufactured by Dutro Company located in Emeryville, California. Such a commercially available hand truck includes a chassis 12 comprised of an inverted U-shaped tubular member 14. The hand truck further includes a flanged load supporting plate 16 connected to the end of the inverted U-shaped tubular member 14 opposite the curved end. The flanged load supporting plate 16 can be connected to the inverted U-shaped tubular member 14 by means of welding the flanged load supporting plate to the inverted U-shaped tubular member. The inverted U-shaped tubular member 14 can also be reinforced by a cross member 18.

The hand truck further includes a wheel assembly 20 mounted to the chassis 12 rearwardly of the connection of the flanged load supporting plate 16 to the inverted U-shaped tubular member 14. The wheel assembly 20 includes a pair of runners 22. Each of the pair of runners 22 is connected at one end to the chassis 12 near the interconnection of the flanged supporting plate 16 and the inverted U-shaped tubular member 14. Gussets 24 can be included to reinforce the connection between the runners 22 and the chassis 12. Each of the pair of runners 22 is also connected at the other end to the chassis 12 intermediate the curved end of the inverted U-shaped tubular member 14 and the end of the inverted U-shaped tubular member to which the flanged load supporting plate 16 is connected.

The wheel assembly 20 also includes an axle 26 connected to each of the pair of runners 22 at a position along the runners located rearwardly of the connection of the runners to the chassis 12. Wheels 28 are rotatably mounted to the ends of the axle 26. A cross brace 30 can be included for reinforcing the pair of runners 22.

The hand truck further includes a handle 32 comprised of a tubular member 34 having a grip 36 at one end. The handle 32 is connected to the flanged load supporting plate 16 at the end opposite the grip 36 and is preferably connected to the cross member 18 and the cross brace 30 intermediate the two ends of the handle.

In one embodiment of the hand truck apparatus 10 in accordance with the invention, frame means, generally indicated by the numeral 38, is mounted for relative movement with respect to the chassis 12. The frame means 38 preferably includes a first upright tubular member 40 and a second upright tubular member 42 interconnected to one another at one end of each of the upright tubular members by a tubular interconnection 44. Preferably, the frame means 38 is reinforced by a cross member 46 interconnected between the first and second upright tubular members 40 and 42 intermediate the ends of the first and second upright tubular members.

The frame means 38 is preferably mounted for relative movement with respect to the chassis 12 as follows. First and second tubular guides 48 and 50 are connected to opposing legs of the inverted U-shaped tubular member 14 intermediate the curved end of the inverted U-shaped tubular member and the end of the U-shaped tubular member to which the flanged load supporting plate 16 is connected. The first and second upright tubular members 40 and 42 are inserted through the first and second tubular guides 48 and 50, respectively, so that the frame means 38 is slidable with respect to the chassis 12.

Furthermore, first and second retainer sleeves 52 and 54 are connected to the legs of the U-shaped tubular member 14 near the interconnection between the inverted U-shaped tubular member and the flanged load supporting plate 16. The respective ends of the first and second upright tubular members 40 and 42 opposite the ends connected by the tubular interconnection 44 are disposed in the first and second tubular retainer sleeves 52 and 54, respectively, for limiting relative movement between the frame means 38 and the chassis 12 to a direction along the longitudinal axis of the chassis.

The hand truck apparatus 10 in accordance with the invention importantly also includes load engaging means, generally indicated by the numeral 56, connected to the first and second upright tubular members 40 and 42, respectively. The load engaging means 56 includes a first tab 60 connected to the first upright tubular member 40. The tab 60 is integral with a first buttress 62 also included in the load engaging means 56, which extends outwardly from the chassis 12 and the frame means 38 in a plane parallel to the plane of the chassis and frame means. The load engaging means 56 further includes a first foot 64 integral with the buttress 62. The load engaging means 56 also includes a second tab 66 connected to the second upright tubular member 42, a second buttress 68 integral with the second tab 66, and a second foot 70 integral with the second buttress 68. The first and second feet 64 and 70 extend outwardly from the frame means 38 in the same direction as the flanged load supporting plate 16 extends from the chassis 12. The first and second feet 64 and 70 can be the same length as the flanged load supporting plate 16 or can be a shorter length as shown in the drawings.

The hand truck apparatus 10 in accordance with the invention also preferably includes a mechanism for applying mechanical advantage for providing relative movement between the frame means 38 and the chassis 12. The mechanical advantage is preferably supplied by a jacking means 72.

The jacking means 72 is preferably interposed between the frame means 38 and the chassis 12 as follows. A platform 74 is connected to the chassis 12. Preferably, the platform 74 is welded to the cross brace 30. The frame means 38 preferably further includes a first diagonal tubular brace 76 and a second diagonal tubular brace 78 interconnected by a tubular cross piece 80. The jacking means 72 is mounted on the platform 74. Since the platform 74 is disposed rearwardly of the chassis 12, the structure of the jacking means 72 does not interfere with placement of a load on the hand truck apparatus 10.

The jacking means 72 preferably includes a jack 81 having a piston 82 connected to the tubular cross piece 80 by means of a swivel 83. The jack 81, for example, can be a Model No. TJ-13001 hydraulic jack distributed by Grace Retail Corporation, New York City, New York. The jack 81 is preferably seated on a rocker pad (not shown). Pins 75 integral with the platform 74 extend through holes in the base of the jack 81 for maintaining the jack on the platform, but for allowing the jack to tilt to and fro on the rocker pad. The seating of the jack 81 and the swivel 83 enable the jack 81 to be rearwardly positioned with respect to the frame means 38.

Preferably, an adjusting means 84 interconnects the piston 82 of the jack 81 to the swivel 83. The adjusting means 84 includes a threaded portion 86 of the piston 82 of the jack 81 and a threaded portion 88 of the swivel 83 interconnected by a nut 90. The nut 90 can be rotated for fine adjustment of the length of travel of the frame means 38 with respect to the chassis 12.

The hand truck apparatus 10 in accordance with the invention also preferably includes a securing means 96 connected to the chassis 12. The securing means 96 preferably includes an eyelet 98 connected to one leg of the inverted U-shaped tubular member 14. The securing means 96 also includes a post 100 connected to the other leg of the inverted U-shaped tubular member 14. The securing means 96 further includes a belt 102 adapted to be connected to the eyelet 98 and wrapped around the post 100. A cinching means 104 is provided for tightening the belt 102 around a load as will be described shortly. The belt 102 and cinching means 104 can be a Model No. 10265 (40-16), two-inch ring lock tie down manufactured by Raco Products Division of Sheffield, Pennsylvania, for example.

Preferably, the hand truck apparatus 10 in accordance with the invention includes a return spring 106. The return spring 106 is connected between an U-bolt 108 mounted on the platform 74 and an eyelet 110 mounted on the first diagonal tubular brace 76 connected to the frame means 38. The return spring 106 aids movement of the frame means 38 relative to the chassis 12 so that the first and second feet 64 and 70 return to the home position in a common plane with the flanged load supporting plate 16 when the jack 81 is deactuated. An enlarged ring 112 can be associated with the jack 81 for releasing pressure in the jack which allows the frame means 38 to move with respect to the chassis 12 under the force of the return spring 106.

In operation, the hand truck apparatus 10 is wheeled into position with respect to a load, for example, a door 114 as shown in FIG. 3. If the load engaging means 56 is not in the home position shown in FIG. 1, the ring 112 is actuated for releasing the pressure in the jack 81 whereupon the force of the return spring 106 applied between the frame means 38 and the chassis 12 returns the first and second feet 64 and 70 to the home position in the same plane as the plane of the flanged load supporting plate 16, as shown in FIG. 1. Thereafter, the ring 112 is deactuated for closing the valve which releases pressure from the jack 81.

After the first and second feet 64 and 70 are in the home position shown in FIG. 1, the user grasps the grip 36 of the handle 32 and slides the flanged load supporting plate 16 and the first an second feet 64 and 70 under the edge of the load. Then, for assuring that the load is secured to the hand truck apparatus 10, the belt 102, connected to the eyelet 98, is strapped around the load and wrapped around the post 100. Thereafter, the cinching means 104 is actuated for tightening the belt 102 around the load. The rearward location of the platform 74 and the use of the swivel 83 provide clearance between the jacking means 72 and the load for facilitating secure placement of the load on the hand truck apparatus 10. The hand truck apparatus 10 can be left unattended by the user with the load strapped on the hand truck apparatus since the flanged load supporting plate 16, lower periphery of the wheels 28, and first and second feet 64 and 70 provide a base for self-stabilizing the hand truck apparatus. The user can then grasp the grip 36 of the handle 32, tilt the hand truck apparatus 10 rearwardly on the wheels 28, and transport the load to any desired location.

In the event that the load is to be unloaded onto a raised surface, the jack 81 can be actuated by means of a jack handle 115 for driving the piston 82 which applies a force to the swivel 83 for moving the frame means 38 with respect to the chassis 12. Movement of the frame means 38 translates through the respective first and second tabs 60 and 66 and first and second buttresses 62 and 68 to upward movement of the first and second feet 64 and 70. The mechanical advantage of the jack 81 overcomes the force of the return spring 106 and the weight of the load and lifts the load to a raised position as shown in FIG. 3.

When the load is lifted to the raised position shown in FIG. 3, the flanged load supporting plate 16 and lower periphery of the wheels 28 remain in contact with the ground for self-stabilizing the hand truck apparatus even if the user releases the grip 36 and leaves the hand truck apparatus unattended.

In one modification of the hand truck apparatus 10 in accordance with the invention, upright felt-covered plates 116 can be connected to the legs of the inverted U-shaped tubular member 14 for protecting the load from contact with the surface of the chassis 12 and the frame means 38. Felt can also be applied to the first and second buttresses 62 and 68 for protecting the load from scratches.

In the case that the load is a door 114 to be installed, before the door is placed on the hand truck apparatus 10, hinge plates can be secured to the edge of the door. Next, the door 114 can be loaded onto the hand truck apparatus 10 as described above. The door 114 can then be transported to the door frame for installation.

When the door 114 is transported to the location of installation, the door is positioned within the door frame, and the jack 81 is actuated for lifting the door so that the hinge plates align with the holes in the door frame for installation of the door. The user first attaches the bottom hinge. Additional actuation of the jack 81 tilts the door 114 toward the door frame, while releasing pressure in the jack 81 permits the door to tilt away from the door frame. Consequently, actuation and/or deactuation of the jack 81 can be used for properly positioning the door to align the door hinges with the holes in the door frame.

After the door 114 is positioned in the door frame for mounting the lower hinge, the user can release the grip 36 and mount the lower hinge to the holes in the door frame since the hand truck apparatus 10 is self-stabilizing even when the door is in the raised position. Since the hand truck apparatus 10 is self-stabilizing, the user can also release the grip 36 for securing the top hinge to the door frame. Consequently, a single worker can install a door in the door frame.

Although the invention has been described and illustrated in detail, it is to be clearly understood that the same is by way of illustration and example only and is not to be taken by way of limitation. Various modifications not described may occur to those skilled in the art which fall within the spirit of this invention. Consequently, the scope of this invention is better ascertained by reference to the appended claims.

What is claimed is:

1. In a hand truck apparatus including a chassis having a longitudinal axis, a load supporting plate positioned centrally of the chassis and having a proximal edge connected to the chassis, first and second side edges, and a distal edge lying outwardly away from the chassis, the load supporting plate having a top surface configured to be slid under a load to contact an underside of the load, and at least one wheel rotatably mounted to the chassis, the improvement comprising:
   frame means;
   means connected to the chassis for slidably mounting the frame means to the chassis so that the frame means is movable with respect to the chassis along the longitudinal axis of the chassis with no significant component of movement outwardly away from the chassis;
   load engaging means connected to the frame means, the load engaging means being positioned adjacent to the first and second side edges of the load supporting plate so that the load engaging means does not overlie the load supporting plate, the load engaging means extending outwardly away from the frame means in the direction of the distal edge of the load supporting plate, the load engaging means having a top surface configured to be slid under the load to contact the underside of the load and being movable together with the frame means between a home position, in which the top surface of the load supporting plate and the top surface of the load engaging means are in an identical plane and in contact with the underside of the load, and a raised position, above the load supporting plate with the load in contact with the load engaging means and not in contact with the load supporting plate; and
   mechanical-advantage means connected between the chassis and the frame means actuable for moving the load engaging means from the home position to the raised position;
   whereby the load supporting plate, wheel, and load engaging means form a base for self-stabilizing the hand truck apparatus when the load engaging means is in the home position and the load supporting plate and the wheel form a base for self-stabilizing the hand truck apparatus when the load engaging means is in the raised position.

2. The apparatus of claim 1 wherein the frame means includes first and second upright tubular members, each of the upright tubular members having a first end and a second end, the respective first ends of the upright tubular members being interconnected by a tubular interconnection, and wherein the means for mounting the frame means to the chassis includes first and second tubular guides and first and second tubular retainer sleeves connected to the chassis, the respective first and second upright tubular members being inserted in the respective first and second tubular guides and the first and second tubular retainer sleeves.

3. The apparatus of claim 1 wherein the load engaging means includes first and second tabs connected to the frame means, first and second buttresses integral with the respective first and second tabs and extending outwardly from the chassis in a plane of the frame means, and first and second feet integral with the respective first and second buttresses and residing on respective sides of the load supporting plate when the load engaging means is in the home position.

4. The apparatus of claim 2 wherein the load engaging means includes first and second tabs connected to the respective first and second upright tubular members, first and second buttresses integral with the respective first and second tabs and extending outwardly from the chassis in a plane of the first and second tubular members, and first and second feet integral with the respective sides of the load supporting plate when the load engaging means is in the home position.

5. The apparatus of claim 1 wherein the mechanical-advantage means includes a platform connected to the chassis, a jack mounted on the platform rearwardly of the plane of the chassis, and connecting means between the jack and the frame means.

6. The apparatus of claim 5 wherein the frame means further includes first and second diagonal tubular braces interconnected by a tubular cross piece and wherein the connecting means includes a swivel connected to the tubular cross piece and an adjusting means for interconnecting the swivel to the jack.

7. The apparatus of claim 2 wherein the mechanical-advantage means includes a platform connected to the chassis, a jack mounted on the platform rearwardly of the plane of the chassis, and connecting means between the jack and the frame means.

8. The apparatus of claim 7 wherein the frame means further includes first and second diagonal tubular braces interconnected by a tubular cross piece and wherein the connecting means includes a swivel connected to the tubular cross piece and an adjusting means for interconnecting the swivel to the jack.

9. The apparatus of claim 6 wherein the adjusting means includes a threaded portion of a piston included in the jack, a threaded portion of the swivel, and a nut interconnecting the respective threaded portions of the piston and the swivel.

10. The apparatus of claim 8 wherein the adjusting means includes a threaded portion of a piston included in the jack, a threaded portion of the swivel, and a nut interconnecting the respective threaded portions of the piston and the swivel.

11. The apparatus of claim 5 further including a U-bolt mounted on the platform, an eyelet mounted on the frame means, and a return spring interconnected between the U-bolt and the eyelet.

12. The apparatus of claim 8 further including a U-bolt mounted on the platform, an eyelet mounted on the frame means, and a return spring interconnected between the U-bolt and the eyelet.

13. The apparatus of claim 1 further including securing means for holding a load on the apparatus.

14. The apparatus of claim 13 wherein the securing means includes an eyelet connected to the chassis, a post connected to the chassis opposite the eyelet, a belt connected to the eyelet, secured around the load, and wrapped around the post, and cinching means for tightening the belt.

15. The apparatus of claim 1 further including felt-covered plates connected to the chassis.

16. The apparatus of claim 5, further comprising a plurality of pins integral with the platform extending away from the platform through holes provided in the base of the jack.

17. The apparatus of claim 7, further comprising a plurality of pins integral with the platform extending away from the platform through holes provided in the base of the jack.

18. Hand truck apparatus for transporting and installing a door, comprising in combination:
a hand truck including a chassis having a longitudinal axis, a door supporting plate positioned centrally of the chassis and having a proximal edge connected to the chassis, first and second side edges, and a distal edge lying outwardly away from the chassis, the door supporting plate having a top surface configured to be slid under a door to contact a lower edge of the door, and at least one wheel rotatably mounted to the chassis;
frame means;
means connected to the chassis for slidably mounting the frame means to the chassis so that the frame means is movable with respect to the chassis along the longitudinal axis of the chassis with no significant component of movement outwardly away from the chassis;
door engaging means comprising first and second feet connected to the frame means, the first and second feet being positioned adjacent to the first and second side edges of the door supporting plate so that the door engaging means does not overlie the door supporting plate, the first and second feet extending outwardly away from the frame means in the direction of the distal edge of the door supporting plate, the first and second feet having respective top surfaces configured to be slid under the door to contact the lower edge of the door and being movable together with the frame means between a home position, wherein the first and second feet reside on respective sides of the door supporting plate with the top surface of the door supporting plate and the top surfaces of the first and second feet being in an identical plane and in contact with the lower edge of the door, and a raised position, above the door supporting plate with the door in contact with the first and second feet and not in contact with the door supporting plate; and
mechanical-advantage means connected between the chassis and the frame means actuable for moving the door engaging means from the home position to the raised position;
whereby the door supporting plate, wheel, and door engaging means form a base for self-stabilizing the hand truck apparatus when the door engaging means is in the home position and the door supporting plate and the wheel form a base for self-stabilizing the hand truck apparatus when the door engaging means is in the raised position.

19. A method for transporting a door to an installation location and installing the door, comprising the steps of:
attaching a plurality of hinge plates to a longitudinal edge of the door;
providing a hand truck apparatus having a chassis with a load supporting plate positioned centrally of the chassis and having a proximal edge connected to the chassis, first and second side edges, and a distal edge lying outwardly away from the chassis, the load supporting plate having a top surface configured to be slid under a door to contact a transverse edge of the door, and at least one wheel rotatably mounted to the chassis, and a frame means having first and second feet disposed outwardly with respect to a longitudinal axis of the chassis, the first and second feet being positioned adjacent to the first and second side edges of the load supporting plate so that the first and second feet do not overlie the load supporting plate, the first and second feet extending outwardly away from the frame means in the direction of the distal edge of the load supporting plate, the first and second feet having respective top surfaces configured to be slid under the door to contact the transverse edge of the door, the frame means being movable between a home position in which the first and second feet reside on respective sides of the load supporting plate with the top surface of the load supporting plate and the top surfaces of the first and second feet being in an identical plane and in contact with the transverse edge of the door and a raised position in which the first and second feet are in a plane above the plane of the load supporting plate with the door in contact with the first and second feet and not in contact with the door supporting plate;
lowering the first and second feet to the home position;
loading the door on the hand truck apparatus so that the transverse edge of the door contacts the load supporting plate and first and second feet;
transporting the door to the installation location;
raising the first and second feet above the load supporting plate so that the hinge plates are properly positioned with respect to the door installation location;
securing the hinge plates to the door frame; and
lowering the first and second feet out of engagement with the transverse edge of the door;
whereby the load supporting plate, wheel, and first and second feet form a base for self-stabilizing the hand truck apparatus when the frame means is in the home position and the load supporting plate and the wheel form a base for self-stabilizing the hand truck apparatus when the frame means is in the raised position.

20. The method of claim 19 wherein the step of securing the hinge plates comprises the steps of:
securing a lower hinge plate;
selectively raising and lowering the first and second feet so that an upper hinge plate is properly positioned; and
securing the upper hinge plate.

* * * * *